(12) United States Patent
Sperlich et al.

(10) Patent No.: US 9,602,318 B2
(45) Date of Patent: Mar. 21, 2017

(54) CLOSED-LOOP HIGH-SPEED CHANNEL EQUALIZER ADAPTATION

(71) Applicant: Texas Instruments Incorporated, Dallas, TX (US)

(72) Inventors: Roland Sperlich, Rockwall, TX (US); Huanzhang Huang, Plano, TX (US); Charles M. Branch, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/819,239

(22) Filed: Aug. 5, 2015

(65) Prior Publication Data

US 2015/0341194 A1    Nov. 26, 2015

Related U.S. Application Data

(63) Continuation of application No. 14/299,187, filed on Jun. 9, 2014, now Pat. No. 9,130,792.

(60) Provisional application No. 61/833,318, filed on Jun. 10, 2013.

(51) Int. Cl.
| | |
|---|---|
| *H03H 7/30* | (2006.01) |
| *H04L 27/01* | (2006.01) |
| *H04L 25/03* | (2006.01) |
| *H04L 25/02* | (2006.01) |
| *H04B 3/14* | (2006.01) |

(52) U.S. Cl.
CPC ............ *H04L 27/01* (2013.01); *H04L 25/026* (2013.01); *H04L 25/03019* (2013.01); *H04L 25/03885* (2013.01); *H04B 3/144* (2013.01)

(58) Field of Classification Search
CPC ...................................................... B04B 3/144
USPC ......................................................... 375/232
See application file for complete search history.

(56) References Cited

U.S. PATENT DOCUMENTS

| 4,677,647 | A * | 6/1987 | Aoyagi | H04L 7/0054 |
| | | | | 375/232 |
| 6,002,723 | A * | 12/1999 | Chethik | H03G 3/3052 |
| | | | | 375/317 |
| 6,490,328 | B1 * | 12/2002 | Wu | H04L 25/03885 |
| | | | | 375/219 |
| 7,787,564 | B1 * | 8/2010 | Anvari | H04L 25/03343 |
| | | | | 330/136 |
| 8,396,105 | B2 * | 3/2013 | Gerfers | H04L 25/0305 |
| | | | | 375/232 |
| 2003/0067997 | A1 * | 4/2003 | Kintis | H04L 25/03038 |
| | | | | 375/329 |
| 2004/0005001 | A1 * | 1/2004 | Jones | H03G 5/005 |
| | | | | 375/232 |
| 2004/0179483 | A1 * | 9/2004 | Perlow | H04L 25/0218 |
| | | | | 370/278 |

(Continued)

*Primary Examiner* — Santiago Garcia
(74) *Attorney, Agent, or Firm* — Tuenlap D. Chan; Charles A. Brill; Frank D. Cimino

(57) ABSTRACT

A serial communication circuit (FIG. 3) is disclosed. The circuit includes an equalizer circuit (306) arranged to receive a data signal (CH 1) and produce an equalized data signal. A log detector circuit (300) receives the data signal and produces a power signal indicating a power level of the data signal. A decision circuit (332) receives the power signal and produces a select signal. A first selection circuit (336) receives a plurality of first correction signals and applies one of the first correction signals to the equalizer circuit in response to the select signal.

23 Claims, 5 Drawing Sheets

(56) References Cited

U.S. PATENT DOCUMENTS

| | | | |
|---|---|---|---|
| 2010/0079216 A1* | 4/2010 | Sakano | H04B 3/145 |
| | | | 333/2 |
| 2011/0124304 A1* | 5/2011 | Tsuchiya | H03F 1/3247 |
| | | | 455/127.1 |
| 2013/0088987 A1* | 4/2013 | Preschutti | H04B 3/46 |
| | | | 370/252 |
| 2014/0073257 A1* | 3/2014 | Tujkovic | H04B 1/123 |
| | | | 455/63.1 |
| 2014/0269890 A1* | 9/2014 | Hoang | H04L 25/03 |
| | | | 375/233 |
| 2014/0362900 A1 | 12/2014 | Sperlich et al. | |

\* cited by examiner

CLOSED-LOOP HIGH-SPEED CHANNEL EQUALIZER ADAPTATION

CROSS-REFERENCE TO RELATED APPLICATIONS

Under 35 U.S.C. §120, this continuation application claims the benefit of and the priority to U.S. patent application Ser. No. 14/299,187, filed on Jun. 9, 2014 and entitled "CLOSED-LOOP HIGH-SPEED CHANNEL EQUALIZER ADAPTION," which under 35 U.S.C. §119(e), claims the benefit of and priority to Provisional Appl. No. 61/833,318 (TI-72906PS), filed Jun. 10, 2013. The entirety of both of these parent applications is incorporated herein by reference.

BACKGROUND

Implementations of the present disclosure relate to a closed-loop, high-speed adaptive channel equalization for serial data communication.

Wireline serial communication systems are widely used for applications such as High-Definition Multimedia Interface (HDMI) systems, Digital Versatile Disc (DVD) players, and audio-visual (AV) systems. A major concern in such applications is the limited channel bandwidth, which causes inter-symbol interference and distortion for binary serial data such as no-return-to-zero (NRZ) and return-to-zero (RZ) sequences. This is further complicated by different cable lengths that may be used in different communication systems. Channel equalization is widely used in these serial communication systems to compensate for limited channel bandwidth as described by Sakano in U.S. Pub. No. 2010/0079216, filed Sep. 18, 2009, and incorporated by reference herein in its entirety. Channel equalization may be performed at the transmitter or the receiver or both in serial data communication systems. When performed at the transmitter, data is typically predistorted by amplifying the high frequency components of the data to compensate for the low-pass characteristic of the channel. When performed at the receiver, low frequency components of received data may be attenuated or high frequency components may be amplified by a channel equalizer to compensate for data distortion.

FIG. 1 is a typical serial data communication receiver as disclosed by Gerfers et al. in U.S. Pat. No. 8,396,105, filed Mar. 12, 2013, and incorporated by reference herein in its entirety. The circuit comprises an adaptable equalizer 10, a plurality of sampling amplifiers or samplers 12, a digital post-processing circuit 14, and a clock recovery circuit 16. A circuit input 11 receives serial data over a data channel and applies it to an input of equalizer 10, which has an output coupled to each of sampling amplifiers 12. Outputs from sampling amplifiers 12 are coupled to digital post-processing circuit 14. Digital post processing circuit 14 has one output coupled to a setting input of equalizer 10. Clock recovery circuit 16 has outputs coupled to sampling amplifiers 12. An input of clock recovery circuit 10 may be coupled to circuit input 11 or to a clock reference. FIG. 1B is an example of different equalizer 10 transfer characteristics. The transfer characteristics are determined by filter coefficients provided from post-processing circuit 14. Equalizers are well known in the art and may comprise various cascade configurations such as two high pass filters and an all pass filter, two band pass filters and a low pass filter, and various other high, low, or band pass filters at different positions in the cascade. These filters may be analog or digital. When equalizer 10 comprises analog filters, processing circuit 14 alters the filter's time constant to tune the filter transfer characteristic.

FIG. 2A is a typical example of distorted serial data bits that may be received at input 11 of the receiver of FIG. 1A. The channel acts as a low pass filter to selectively attenuate high frequency components of the serial data stream. In general, the distortion is greater for longer cable lengths and higher transmit frequencies. FIG. 2B shows a typical example of the received serial data bits of FIG. 2A after equalization. A goal of channel equalization is to effectively complement the channel transfer characteristic by acting as a high pass filter, so that data bits are properly decoded and bit error rate (BER) is reduced. One of the problems with channel equalization, however, is that all channel characteristics are not the same. Moreover, different cable lengths, data patterns, and frequency significantly affect received power and serial data distortion.

While preceding approaches may provide improvements in high-speed serial data equalization, the present disclosure is directed to further improvements in speed, throughput, and an improved error rate. Accordingly, the preferred implementations described below are directed toward improving upon the prior art.

SUMMARY

In a preferred implementation of the present disclosure, a serial communication circuit is disclosed. The circuit includes an equalizer circuit coupled to receive a data signal and produce an equalized data signal. A log detector circuit receives the data signal and produces a power signal indicating a power level of the data signal. A decision circuit receives the power signal and produces a select signal. A first selection circuit receives a plurality of first correction signals and applies one of the first correction signals to the equalizer circuit in response to the select signal.

DETAILED DESCRIPTION

The preferred implementations of the present disclosure provide significant advantages over serial communication circuits of the prior art as will become evident from the following detailed description.

Figure 1A:
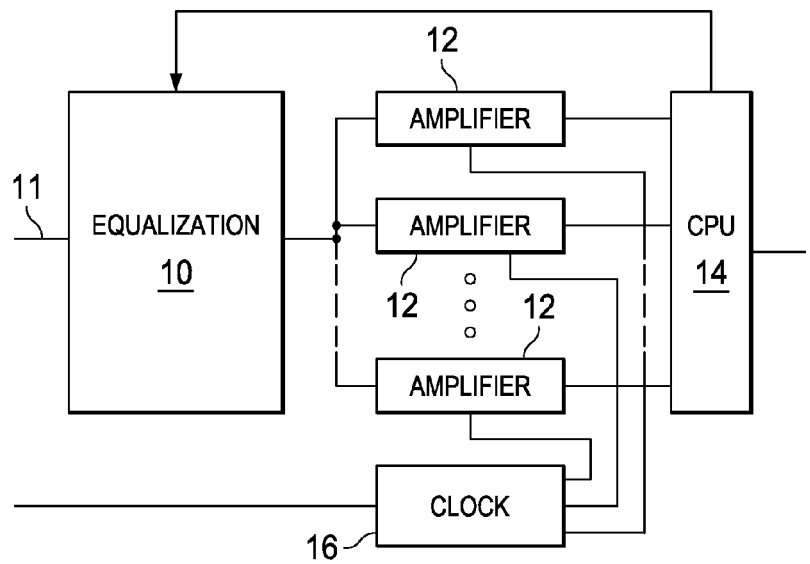
FIG. 1A is a circuit diagram of a data communication circuit of the prior art.
Figure 1B:
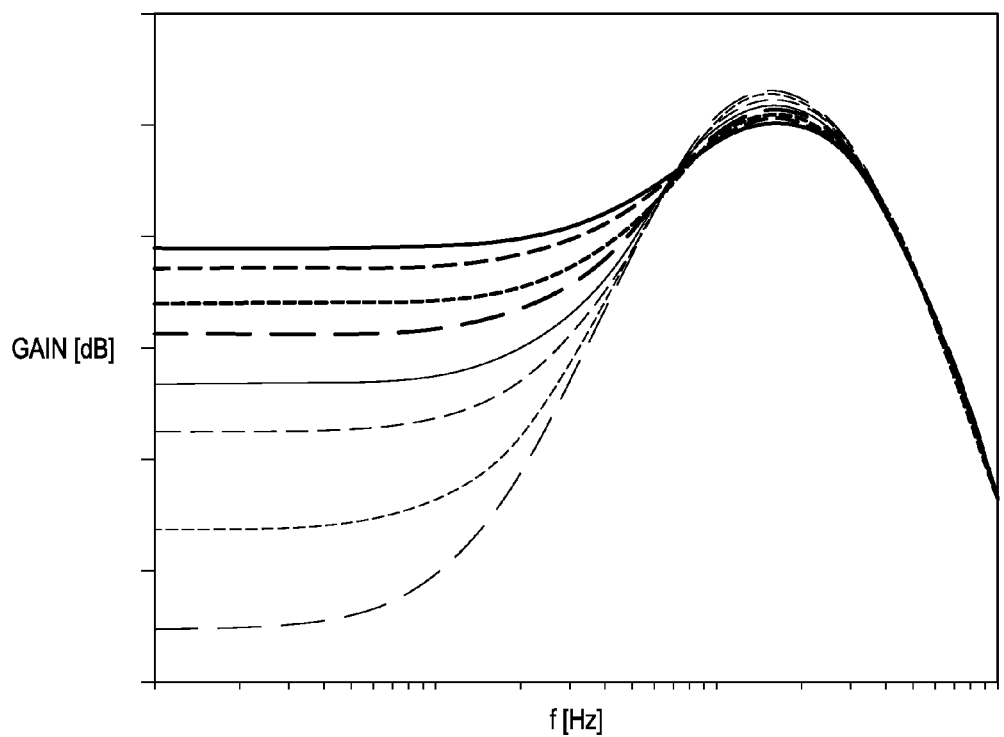
FIG. 1B is a diagram of equalizer transfer characteristics of the equalizer 10 of FIG. 1A.
Figure 2A:
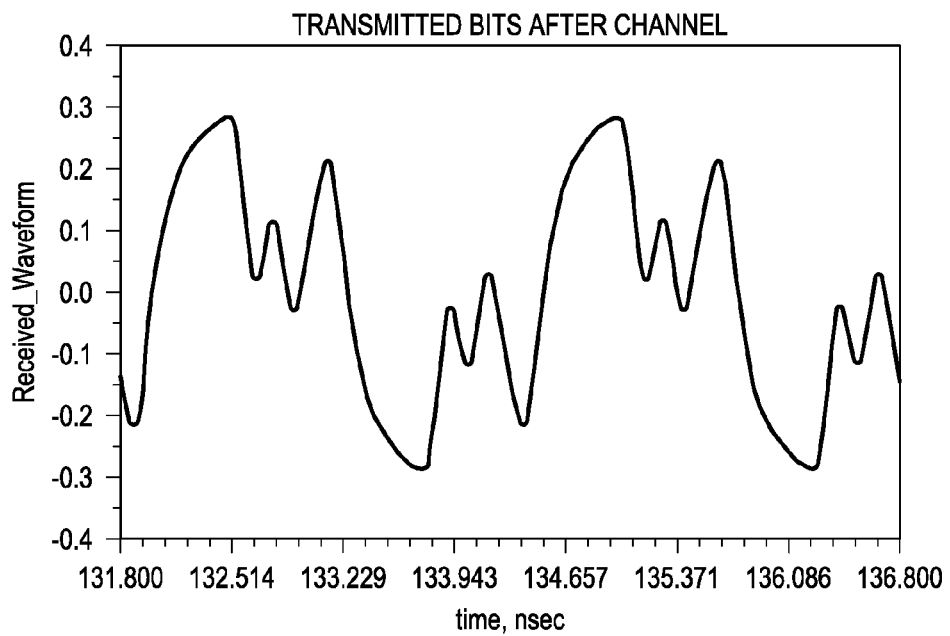
FIG. 2A is an exemplary diagram of a data sequence before equalization.
Figure 2B:
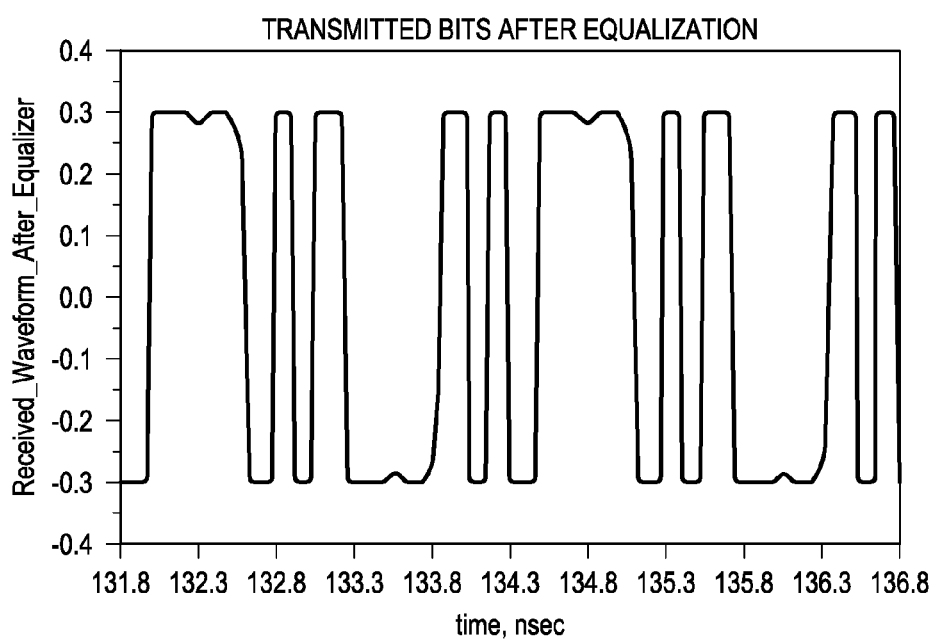
FIG. 2B is a diagram of the data sequence of FIG. 2A after equalization.
Figure 3:
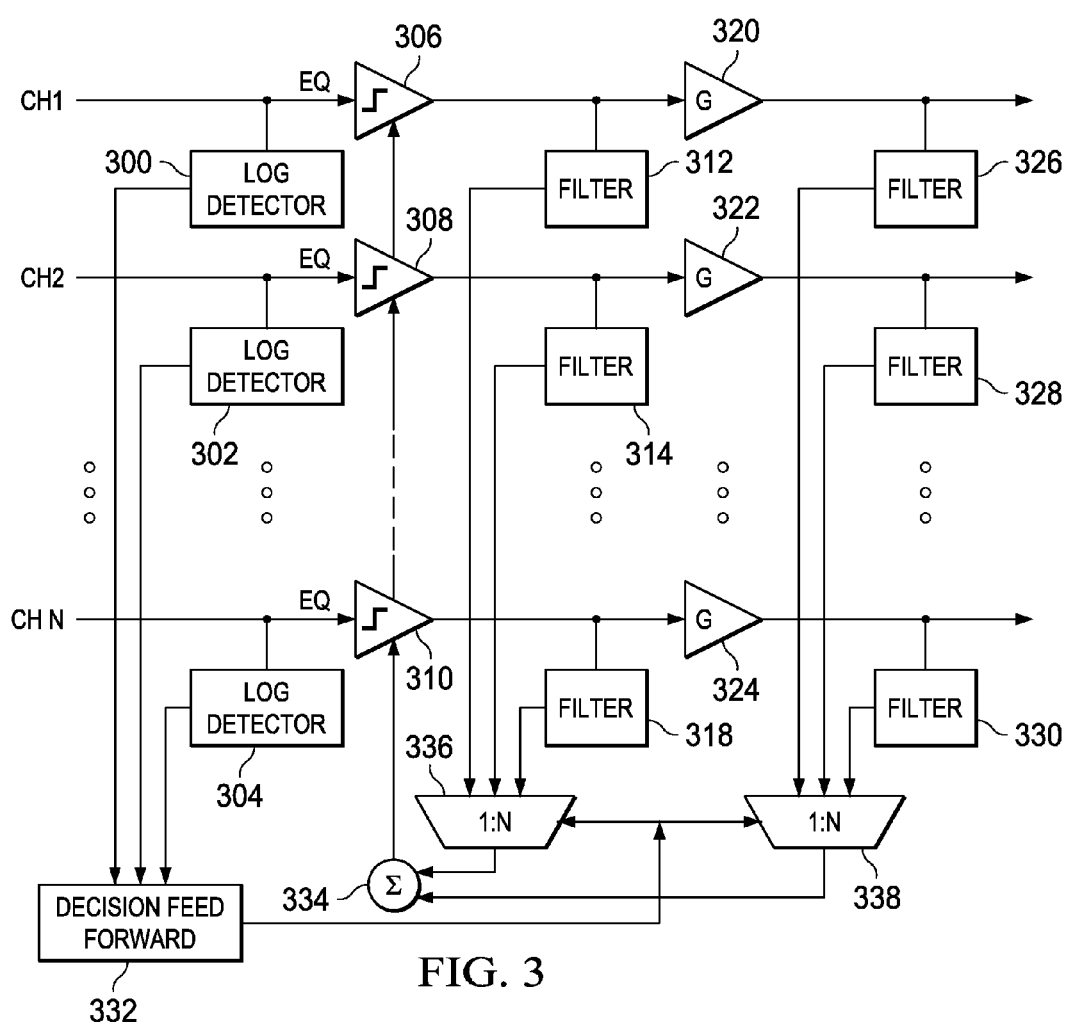
FIG. 3 is a circuit diagram of a first implementation of a serial data communication circuit of the present disclosure.

Referring to FIG. 3, there is a circuit diagram of a first implementation of a serial data communication circuit of the present disclosure. Here and in the following discussion, one of ordinary skill in the art having access to the instant specification will appreciate that implementations of the present disclosure may be applied to analog, digital, or mixed mode applications. The communication circuit is arranged to receive serial data over N channels, where N is a positive integer. The channels may include multiple leads of a High-Definition Multimedia Interface (HDMI) cable, multiple leads of a Digital Versatile Disc (DVD) cable, circuit board leads, or other serial media. The circuit includes N equalizer circuits 306-310 that are coupled to receive serial data on respective channels 1-N and produce equalized serial data. The equalized serial data is applied to filter circuits 312-318, which produce respective first correction signals that are applied to selection circuit 336. The equalized serial data is also applied to N respective amplifiers 320-324, which produce equalized and amplified serial data. The equalized and amplified serial data is applied to filter circuits 326-330, which produce respective second correction signals that are applied to selection circuit 338.

Figure 5:
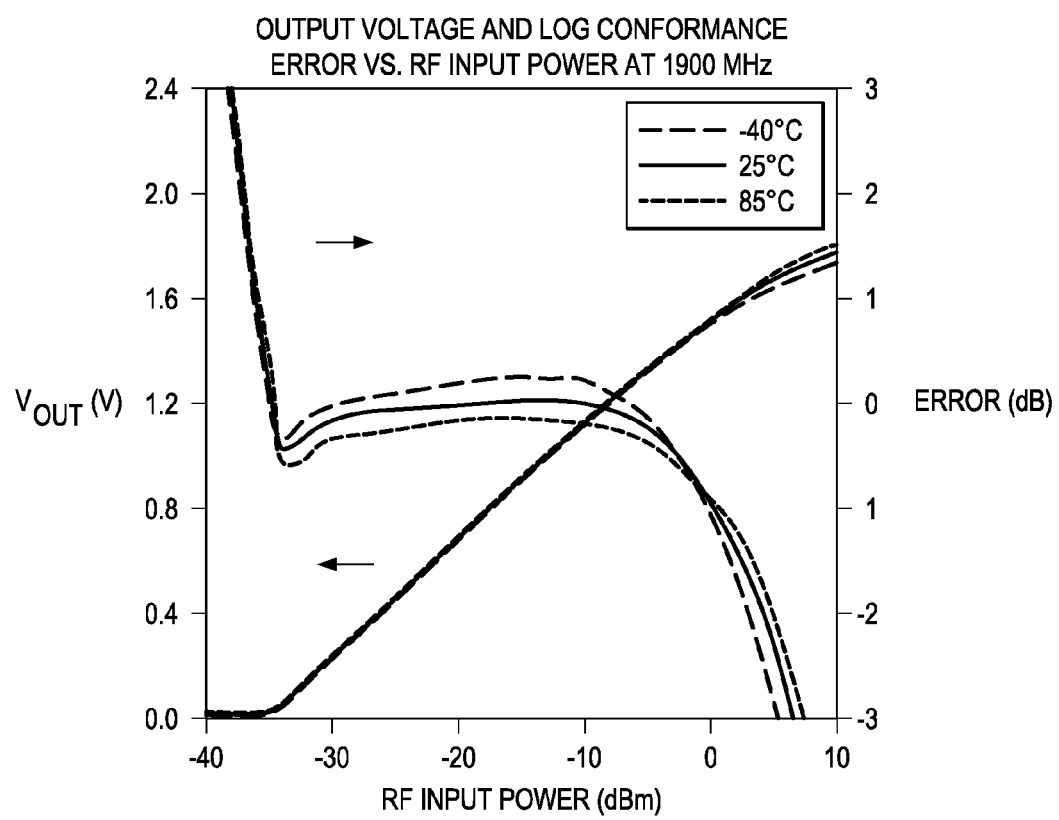
FIG. 5 is a diagram of output voltage of a log detector circuit (Texas Instruments Incorporated LMH2110) as a function of input power.

The communication circuit also includes N log detector circuits 300-304 that are coupled to receive serial data on the N respective channels. Each log detector circuit produces a respective power signal that indicates a power level of the serial data signal of the respective channel. Log detector circuits such as 300-304 are well known to those of ordinary skill in the art. By way of illustration, FIG. 5 shows an output signal of an LMH2110™ log detector circuit manufactured by Texas Instruments Incorporated®. The log detector circuit produces a substantially linear power signal ($V_{OUT}$) over a predetermined logarithmic range of RF input power. Other log detector circuits such as the LT5538, manufactured by Linear Technology Corporation, are comparable.

Power signals from the N log detector circuits 300-304 are applied to decision feed forward circuit 332. Decision feed forward circuit 332 compares the power signals to predetermined power thresholds and stores a select signal. In a preferred implementation of the present disclosure, the select signal corresponds to the channel having the least power. Alternatively, the select signal may correspond to an average of two or more power signals. The select signal is applied to select circuits 336 and 338. Select circuit 336 responsively selects one of the first correction signals from filters 312-318 and applies the selected correction signal to sum circuit 334. Likewise, select circuit 338 responsively selects one of the second correction signals from filters 326-330 and applies the selected correction signal to sum circuit 334. Sum circuit 334 adds the correction signals and applies the sum to equalizer circuits 306-310. The equalizer circuits responsively adjust their pass characteristics to approximately complement the channel characteristic.

In operation, serial data is received by the communication circuit over the N respective channels. Equalizer circuits 306-310 equalize the serial data according to a currently selected correction signal. Filters 312-318 sample the equalized serial data to determine signal attenuation over a first design bandwidth. For example, if high frequency components of serial data are attenuated by a respective channel, a correction signal is generated to alter the equalizer characteristic for that channel Amplifier circuits 320-324 amplify the equalized serial data. Filters 326-330 sample the equalized and amplified serial data to determine signal attenuation over a second design bandwidth. The second design bandwidth, for example, may extend correction beyond the first design bandwidth and generate a second set of correction signals for respective channels.

Log detector circuits 300-304 generate respective power signals indicating the power level of serial data on respective channels 1-N. The power signals are applied to decision feed forward circuit 332. Decision feed forward circuit 332 is programmed with predetermined threshold values. These predetermined threshold values prequalify the serial data for adaptation by equalizer circuits 300-304. For example, if the range of power signals is substantially unchanged from previous levels, the stored selection signal remains unchanged. However, if the range of power signals varies significantly, then the stored select signal is updated to select different correction signals. The stored select signal is then applied to selection circuits 336 and 338 to select correction signals that optimize serial data equalization.

The present disclosure offers several advantages over equalization circuits of the prior art. First, the equalization is based on power of the received serial data as measured by each log detector circuit. Second, the decision feed forward circuit stores a select signal that may remain relatively unchanged until received power levels change. Thus, equalizer characteristics need not be frequently updated. Third, the log detector circuits do not require special training sequences. Fourth, correction signals produced by the dual filter sets 312-318 and 326-330 monitor a broad range of frequencies to optimize equalization. Finally, the decision feed forward circuit may be activated at power up or by software during normal circuit operation for maximum flexibility.

Figure 4:
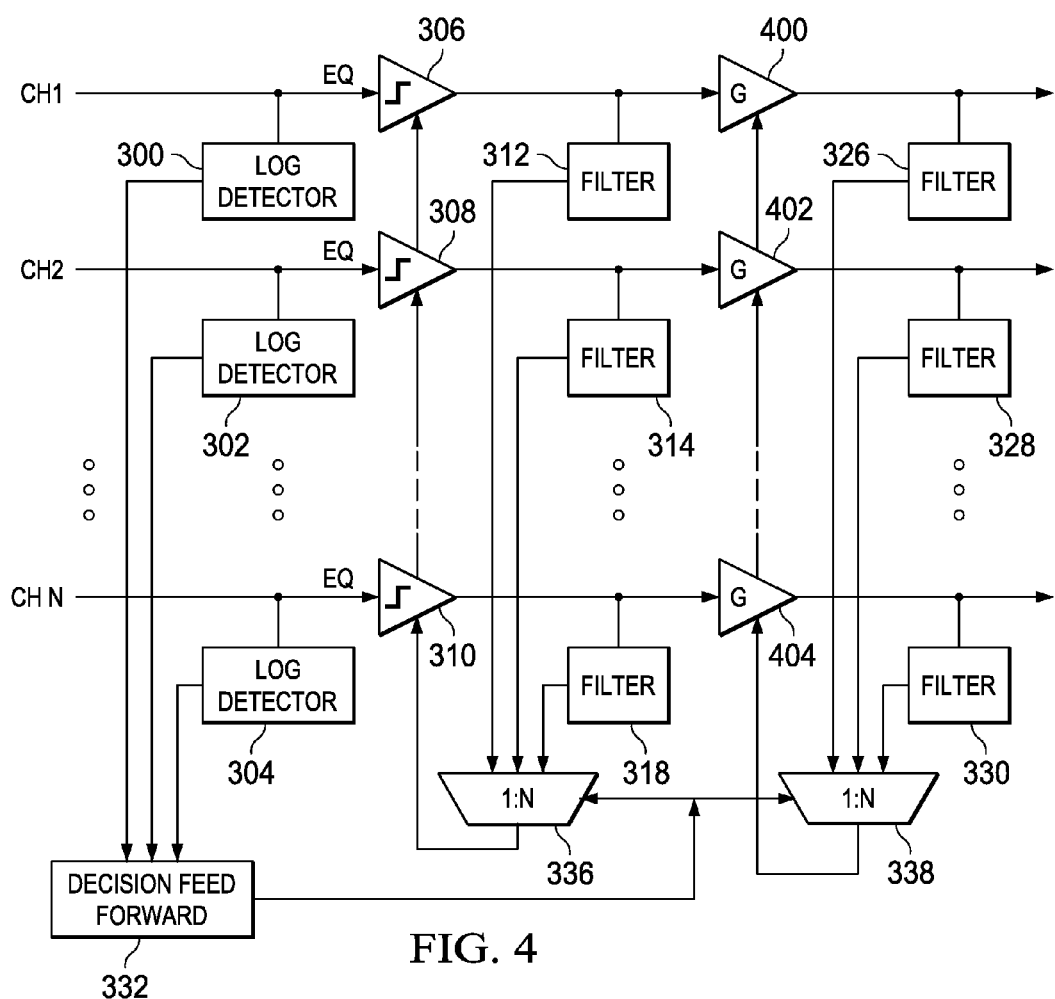
FIG. 4 is a circuit diagram of a second implementation of a serial data communication circuit of the present disclosure.

Turning now to FIG. 4, there is a second implementation of the present disclosure. The second implementation is similar to the first implementation of FIG. 3, and the same reference numerals are used to indicate substantially the same circuit elements. Sum circuit 334, however, is eliminated. Correction signals from filters 312-318 are applied to selection circuit 336 as previously described. The selection circuit 336 selects one of these correction signals in response to the select signal and applies it to equalizer circuits 306-310. Variable gain amplifier circuits 400-404 replace respective amplifier circuits 320-324 (FIG. 3). Correction signals from filters 326-330 are applied to selection circuit 338 as previously described. The selection circuit 338 selects one of these correction signals in response to the select signal and applies it to variable gain amplifiers 400-404. This implementation of the present disclosure provides all the advantages of the first implementation of FIG. 3. Additionally, the implementation of FIG. 4 advantageously permits independent control of equalization circuits 306-310 and variable gain amplifiers 400-404.

Still further, while numerous examples have thus been provided, one skilled in the art should recognize that various modifications, substitutions, or alterations may be made to the described implementations while still falling within the inventive scope as defined by the following claims. Other combinations will be readily apparent to one of ordinary skill in the art having access to the instant specification.

What is claimed is:

1. A circuit comprising:
    an input lead configured to receive a data signal;
    an equalizer circuit coupled with the input lead to receive the data signal, the equalizer circuit configured to equalize the data signal based on a correction signal;
    an equalization filter coupled with the equalizer circuit to receive the equalized data signal, the equalization filter configured to generate the correction signal based on a signal attenuation of the equalized data signal; and
    a regulation circuit coupled with the input lead to receive the data signal, and coupled with the equalization filter to receive the correction signal, the regulation circuit configured to selectively deliver or block the correction signal from the equalization filter to the equalizer circuit based on a power level of the data signal received from the input lead.

2. The circuit of claim 1, wherein
the equalizer circuit is selectively coupled with the equalization filter to receive the correction signal; and
the equalizer circuit is configured to adjust a pass characteristic to compensate the signal attenuation of the equalized data signal.

3. The circuit of claim 1, wherein the regulation circuit includes:
a log detector circuit coupled with the input lead to receive the data signal, the log detector circuit configured to generate a power signal representing the power level of the data signal;
a decision feed forward circuit coupled with the log detector circuit to receive the power signal, the decision feed forward circuit configured to alter a select signal when the power level is below a threshold; and
a selection circuit coupled with the decision feed forward circuit to receive the select signal, and coupled with the equalization filter to receive the correction signal, the selection circuit configured to select the correction signal for delivery to the equalizer circuit based on the select signal.

4. The circuit of claim 3, wherein: the data signal includes data channels;
the log detector circuit includes log detectors, each configured to receive only one of the data channels and generate a channel power signal of the power signal, the channel power signal representing the power level of the corresponding data channel;
the decision feed forward circuit coupled with the log detectors to receive the channel power signals, the decision feed forward circuit configured to alter the select signal based on one of the channel power signals representing a minimum power level among the data channels.

5. The circuit of claim 4, wherein:
the equalizer circuit includes equalizers, each configured to receive only one of the data channels and equalize the received data channel based on the selected correction signal;
the equalization filter is configured to generate the correction signal including channel correction signals, each based on a channel signal attenuation of one of the equalized data channels; and
the selection circuit configured to select one of the channel correction signals as the selected correction signal based on the select signal, the selected correction signal corresponding to the data channel having the minimum power level, the selection circuit configured to output the selected correction signal for delivery to the corresponding equalizer.

6. The circuit of claim 1, further comprising:
an amplifier circuit coupled with the equalizer circuit to receive the equalized data signal, the amplifier circuit configured to amplify the equalized data signal; and
an amplification filter coupled with the amplifier circuit to receive the amplified equalized data signal, the amplification filter configured to generate a second correction signal based on a second signal attenuation of the amplified equalized data signal.

7. The circuit of claim 6, wherein the regulation circuit is configured to generate a select signal based on the power level of the data signal, the regulation circuit includes:
a first selection circuit coupled with the equalization filter to receive the correction signal, the first selection circuit configured to selectively output the correction signal based on the select signal;
a second selection circuit coupled with the amplification filter to receive the second correction signal, the second selection circuit configured to selectively output the second correction signal based on the select signal; and
a sum circuit coupled with the first selection circuit and the second selection circuit, the sum circuit configured to integrate the second correction signal to the correction signal for delivery to the equalizer circuit.

8. The circuit of claim 7, wherein:
the equalizer circuit is configured to adjust a pass characteristic based on the correction signal to compensate the signal attenuation of the equalized data signal and the second signal attenuation of the amplified equalized data signal.

9. The circuit of claim 6, wherein the regulation circuit is configured to generate a select signal based on the power level of the data signal, the regulation circuit includes:
a first selection circuit coupled with the equalization filter to receive the correction signal, the first selection circuit configured to selectively deliver the correction signal to the equalizer circuit based on the select signal; and
a second selection circuit coupled with the amplification filter to receive the second correction signal, the second selection circuit configured to selectively deliver the second correction signal to the amplifier circuit based on the select signal.

10. The circuit of claim 9, wherein:
the amplifier circuit has an adjustable gain, and
the amplifier circuit is configured to adjust the adjustable gain based on the second correction signal to compensate the second signal attenuation.

11. The circuit of claim 6, wherein:
the equalization filter is configured to sample the equalized data signal to determine the signal attenuation over a first design bandwidth; and
the amplification filter is configured to sample the amplified equalized data signal to determine the second signal attenuation over a second design bandwidth extending beyond the first design bandwidth.

12. The circuit of claim 1, wherein the input lead includes input pins, each adapted to receive serial data from an output pin of a data cable selected from a group consisting of a High-Definition Multimedia Interface (HDMI) cable and a Digital Versatile Disc (DVD) cable.

13. A circuit comprising:
an equalizer circuit configured to receive a data signal, the equalizer circuit configured to equalize the data signal based on a correction signal;
an first filter coupled with the equalizer circuit to receive the equalized data signal, the first filter configured to generate a first correction signal based on a first signal attenuation of the equalized data signal;
an amplifier circuit coupled with the equalizer circuit to receive the equalized data signal, the amplifier circuit configured to amplify the equalized data signal; and
an second filter coupled with the amplifier circuit to receive the amplified equalized data signal, the second filter configured to generate a second correction signal based on a second signal attenuation of the amplified equalized data signal; and a regulation circuit coupled with the first and second filters, the regulation circuit configured to generate the correction signal by selecting the first correction signal and the second correction signal based on a power level of the data signal.

14. The circuit of claim 13, wherein:

the first filter is configured to sample the equalized data signal to determine the first signal attenuation over a first design bandwidth;

the second filter is configured to sample the amplified equalized data signal to determine the second signal attenuation over a second design bandwidth extending beyond the first design bandwidth; and the equalizer circuit is configured to adjust a pass characteristic to compensate the first signal attenuation and the second signal attenuation based on the correction signal.

15. The circuit of claim 13, wherein the regulation circuit includes:

a log detector circuit configured to generate a power signal representing the power level of the data signal; and a decision feed forward circuit coupled with the log detector circuit, and configured to alter a select signal when the power level is below a threshold.

16. The circuit of claim 15, wherein the regulation circuit includes:

a first selection circuit coupled with the first filter to receive the first correction signal, the first selection circuit configured to selectively output the first correction signal based on the select signal;

a second selection circuit coupled with the second filter to receive the second correction signal, the second selection circuit configured to selectively output the second correction signal based on the select signal; and a sum circuit coupled with the first selection circuit and the second selection circuit, the sum circuit configured to generate the correction signal by combining the selected first correction signal and the selected second correction signal.

17. A circuit comprising:

an equalizer circuit configured to receive a data signal, the equalizer circuit configured to equalize the data signal based on a first correction signal;

an first filter coupled with the equalizer circuit to receive the equalized data signal, the first filter configured to generate the first correction signal based on a first signal attenuation of the equalized data signal;

an amplifier circuit coupled with the equalizer circuit to receive the equalized data signal, the amplifier circuit configured to amplify the equalized data signal based on a second correction signal; and an second filter coupled with the amplifier circuit to receive the amplified equalized data signal, the second filter configured to generate the second correction signal based on a second signal attenuation of the amplified equalized data signal; and a regulation circuit coupled with the first and second filters, the regulation circuit configured to selectively deliver the first correction signal to the equalizer circuit and selectively deliver the second correction signal to the amplifier circuit based on a power level of the data signal.

18. The circuit of claim 17, wherein:

the first filter is configured to sample the equalized data signal to determine the first signal attenuation over a first design bandwidth;

the equalizer circuit is configured to adjust a pass characteristic to compensate the first signal attenuation based on the selected first correction signal;

the second filter is configured to sample the amplified equalized data signal to determine the second signal attenuation over a second design bandwidth extending beyond the first design bandwidth; and the amplifier circuit is configured to adjust an adjustable gain based on the second correction signal to compensate the second signal attenuation.

19. The circuit of claim 17, wherein the regulation circuit includes:

a log detector circuit configured to generate a power signal representing the power level of the data signal; and a decision feed forward circuit coupled with the log detector circuit, and configured to alter a select signal when the power level is below a threshold.

20. The circuit of claim 19, wherein the regulation circuit includes:

a first selection circuit coupled with the equalization filter to receive the correction signal, the first selection circuit configured to selectively deliver the first correction signal to the equalizer circuit based on the select signal; and a second selection circuit coupled with the amplification filter to receive the second correction signal, the second selection circuit configured to selectively deliver the second correction signal to the amplifier circuit based on the select signal.

21. A circuit comprising:

an input lead configured to receive a data signal;

an equalizer circuit coupled with the input lead to receive the data signal, the equalizer circuit configured to equalize the data signal based on a correction signal;

an equalization filter coupled with the equalizer circuit to receive the equalized data signal, the equalization filter configured to generate the correction signal based on a signal attenuation of the equalized data signal; and a regulation circuit including:

a log detector circuit coupled with the input lead to receive the data signal, the log detector circuit configured to generate a power signal representing the power level of the data signal;

a decision feed forward circuit coupled with the log detector circuit to receive the power signal, the decision feed forward circuit configured to alter a select signal when the power level is below a threshold; and a selection circuit coupled with the decision feed forward circuit to receive the select signal, and coupled with the equalization filter to receive the correction signal, the selection circuit configured to select the correction signal for delivery to the equalizer circuit based on the select signal.

22. A circuit comprising:

an equalizer circuit configured to receive a data signal, the equalizer circuit configured to equalize the data signal based on a correction signal by adjusting a pass characteristic to compensate a first signal attenuation and a second signal attenuation based on the correction signal;

an first filter coupled with the equalizer circuit to receive the equalized data signal, the first filter configured to: sample the equalized data signal to determine the first signal attenuation over a first design bandwidth, and generate a first correction signal based on the first signal attenuation of the equalized data signal;

an amplifier circuit coupled with the equalizer circuit to receive the equalized data signal, the amplifier circuit configured to amplify the equalized data signal; and an second filter coupled with the amplifier circuit to receive the amplified equalized data signal, the second filter configured to: to sample the amplified equalized data signal to determine the second signal attenuation over a second design bandwidth extending beyond the first design bandwidth, and generate a second correction signal based on the second signal attenuation of the amplified equalized data signal; and a regulation circuit coupled with the first and second filters, the regulation circuit configured to generate the correction signal by selecting the first correction signal and the second correction signal based on a power level of the data signal.

23. A circuit comprising:

an equalizer circuit configured to receive a data signal, the equalizer circuit configured to equalize the data signal based on a first correction signal;

an first filter coupled with the equalizer circuit to receive the equalized data signal, the first filter configured to generate the first correction signal based on the first signal attenuation of the equalized data signal;

an amplifier circuit coupled with the equalizer circuit to receive the equalized data signal, the amplifier circuit configured to amplify the equalized data signal based on a second correction signal; and an second filter coupled with the amplifier circuit to receive the amplified equalized data signal, the second filter configured to generate the second correction signal based on a second signal attenuation of the amplified equalized data signal; and a regulation circuit coupled with the first and second filters, the regulation circuit configured to selectively deliver the first correction signal to the equalizer circuit and selectively deliver the second correction signal to the amplifier circuit based on a power level of the data signal, wherein the first filter is configured to sample the equalized data signal to determine the signal attenuation over a first design bandwidth;

wherein the equalizer circuit is configured to adjust a pass characteristic to compensate the first signal attenuation based on the selected first correction signal;

wherein the second filter is configured to sample the amplified equalized data signal to determine the second signal attenuation over a second design bandwidth extending beyond the first design bandwidth; and wherein the amplifier circuit is configured to adjust an adjustable gain based on the second correction signal to compensate the second signal attenuation.

\* \* \* \* \*